(12) United States Patent
Houri (10) Patent No.: US 8,565,788 B2
(45) Date of Patent: Oct. 22, 2013

(54) METHOD AND SYSTEM FOR OBTAINING LOCATION OF A MOBILE DEVICE

(75) Inventor: Cyril Houri, New York, NY (US)

(73) Assignee: Mexens Intellectual Property Holding LLC, Miami Beach, FL (US)

(*) Notice: Subject to any disclaimer, the term of this patent is extended or adjusted under 35 U.S.C. 154(b) by 980 days.

(21) Appl. No.: 12/167,649

(22) Filed: Jul. 3, 2008

(65) Prior Publication Data

US 2008/0268870 A1 Oct. 30, 2008

Related U.S. Application Data (63) Continuation-in-part of application No. 11/170,337, filed on Jun. 29, 2005, now Pat. No. 7,397,424, and a continuation-in-part of application No. 11/549,703, filed on Oct. 16, 2006, now Pat. No. 7,686,923.

(60) Provisional application No. 60/649,180, filed on Feb. 3, 2005.

(51) Int. Cl.
*H04W 24/00* (2009.01)
*H04M 3/42* (2006.01)

(52) U.S. Cl.
USPC ............... 455/456.2; 455/456.5; 455/456.6; 455/414.1

(58) Field of Classification Search
USPC ......... 455/456.1, 456.2, 456.3, 456.5, 456.6, 455/466, 414.1
See application file for complete search history.

(56) References Cited

U.S. PATENT DOCUMENTS

| | | |
|---|---|---|
| 5,185,860 A | 2/1993 | Wu |
| 5,675,741 A | 10/1997 | Aggarwal et al. |
| 5,835,720 A | 11/1998 | Nelson et al. |
| 5,918,181 A | 6/1999 | Foster et al. |
| 5,944,790 A | 8/1999 | Levy |
| 5,948,055 A | 9/1999 | Pulsipher et al. |
| 5,948,061 A | 9/1999 | Merriman et al. |
| 6,047,234 A | 4/2000 | Cherveny et al. |
| 6,151,631 A | 11/2000 | Ansell et al. |
| 6,289,341 B1 | 9/2001 | Barney |
| 6,377,987 B1 | 4/2002 | Kracht |
| 6,412,014 B1 | 6/2002 | Ryan |
| 6,425,007 B1 | 7/2002 | Messinger |
| 6,507,869 B1 | 1/2003 | Franke et al. |
| 6,508,710 B1 | 1/2003 | Paravia et al. |
| 6,665,715 B1 | 12/2003 | Houri |
| 6,718,176 B2 * | 4/2004 | Michaud et al. ............... 455/457 |
| 6,768,450 B1 | 7/2004 | Walters et al. |

(Continued)

FOREIGN PATENT DOCUMENTS

WO    WO 2008017830 A1 *    2/2008

*Primary Examiner* — Christopher M Brandt
(74) *Attorney, Agent, or Firm* — Brian Roffe (57) ABSTRACT

Method and platform for providing the location of a first mobile device to a second device in which the second device generates a query for the location of the first device which is in the form of an SMS or push e-mail message and which is directed to the first device. Upon receipt of the query, the first device initiates a determination of its location, either by itself or by providing information to a central server, and the determined location of the first device is then directed to the second device, either directly from the central server or via the first device. The central server may direct a transmission of the location of the first device to the second device in an SMS message.

25 Claims, 5 Drawing Sheets

(56) References Cited

U.S. PATENT DOCUMENTS

| | | |
|---|---|---|
| 6,847,892 B2 | 1/2005 | Zhou et al. |
| 6,919,842 B2 | 7/2005 | Cho |
| 6,925,378 B2 | 8/2005 | Tzamaloukas |
| 7,000,015 B2 | 2/2006 | Moore et al. |
| 7,039,427 B2* | 5/2006 | Tachikawa ............... 455/457 |
| 7,050,787 B2 | 5/2006 | Caci |
| 7,076,365 B2 | 7/2006 | Tzamaloukas |
| 7,106,717 B2* | 9/2006 | Rousseau et al. ........... 370/338 |
| 7,139,820 B1* | 11/2006 | O'Toole et al. ............. 709/223 |
| 7,177,651 B1* | 2/2007 | Almassy ................ 455/456.1 |
| 7,231,218 B2* | 6/2007 | Diacakis et al. ......... 455/456.1 |
| 7,349,702 B2 | 3/2008 | Graumann |
| 7,363,024 B2 | 4/2008 | Jenkins |
| 7,647,164 B2* | 1/2010 | Reeves ..................... 701/516 |
| 2003/0069693 A1 | 4/2003 | Snapp et al. |
| 2003/0073440 A1* | 4/2003 | Mukherjee et al. ......... 455/435 |
| 2003/0100294 A1* | 5/2003 | Hosono ..................... 455/414 |
| 2003/0105818 A1 | 6/2003 | Lapstun et al. |
| 2003/0125042 A1* | 7/2003 | Olrik. et al. ................ 455/456 |
| 2003/0194993 A1* | 10/2003 | Fomukong ............... 455/414.1 |
| 2003/0211853 A1* | 11/2003 | Banno ..................... 455/456.6 |
| 2004/0132465 A1* | 7/2004 | Mattila et al. ............ 455/456.1 |
| 2004/0166879 A1* | 8/2004 | Meadows et al. ........ 455/456.1 |
| 2004/0180645 A1 | 9/2004 | Bussan et al. |
| 2004/0198398 A1* | 10/2004 | Amir et al. ............... 455/456.6 |
| 2004/0203603 A1* | 10/2004 | Pierce et al. ................ 455/411 |
| 2004/0203903 A1* | 10/2004 | Wilson et al. ............ 455/456.1 |
| 2004/0203926 A1 | 10/2004 | Ruutu et al. |
| 2004/0266457 A1 | 12/2004 | Dupray |
| 2005/0105600 A1 | 5/2005 | Culum et al. |
| 2005/0136845 A1 | 6/2005 | Masuoka et al. |
| 2005/0164704 A1 | 7/2005 | Winsor |
| 2005/0186969 A1* | 8/2005 | Lohtia ..................... 455/456.3 |
| 2005/0202830 A1* | 9/2005 | Sudit ....................... 455/456.1 |
| 2005/0227689 A1 | 10/2005 | Jewett |
| 2005/0251326 A1* | 11/2005 | Reeves ..................... 701/200 |
| 2005/0278758 A1 | 12/2005 | Bodlaender |
| 2005/0282558 A1 | 12/2005 | Choi et al. |
| 2006/0030339 A1* | 2/2006 | Zhovnirovsky et al. ... 455/456.6 |
| 2006/0046749 A1* | 3/2006 | Pomerantz et al. ........... 455/457 |
| 2006/0170591 A1 | 8/2006 | Houri |
| 2006/0183486 A1* | 8/2006 | Mullen ..................... 455/456.1 |
| 2006/0224319 A1 | 10/2006 | Rogers |
| 2008/0186162 A1* | 8/2008 | Rajan et al. ............. 340/539.13 |
| 2009/0197612 A1* | 8/2009 | Kiiskinen ................ 455/456.1 |

* cited by examiner

METHOD AND SYSTEM FOR OBTAINING LOCATION OF A MOBILE DEVICE

CROSS REFERENCE TO RELATED APPLICATIONS

This application is:

1) a continuation-in-part of U.S. patent application Ser. No. 11/170,337 filed Jun. 29, 2005, now U.S. Pat. No. 7,397,424, which claims priority under 35 U.S.C. §119(e) of U.S. provisional patent application Ser. No. 60/649,180 filed Feb. 3, 2005, now expired; and 2) a continuation-in-part of U.S. patent application Ser. No. 11/549,703 filed Oct. 16, 2006.

All of the above applications are incorporated by reference herein.

FIELD OF THE INVENTION

The present invention relates generally to methods and systems for enabling the location of a wireless computing device or mobile device to be obtained by another device, e.g., by another wireless computing device or mobile device.

BACKGROUND OF THE INVENTION

As portable mobile devices proliferate, there is a growing demand to continuously and accurately know the geographic location of the mobile devices. There are basically two different ways to determine the geographic locations of a mobile device, either using a wireless positioning network such the GPS system or using a database of wireless beacons and determining position using this database.

The first technique suffers from the difficulty in continuously obtaining signals, e.g., from a network of satellite, to enable the position of the mobile device to be determined. It is recognized that such difficulties commonly arise in enclosed areas and confined areas, such as in areas with a large concentration of tall buildings and in tunnels.

The second technique requires the creation of a database of wireless beacons, and the mobile device to be within range of a plurality of such wireless beacons. In the absence of wireless beacons within range, the position of the mobile device cannot be determined.

For the second technique, several systems are being used to enable mobile devices to determine their position. One such system is Place Lab. Place Lab is software providing low-cost, easy-to-use device positioning for location-enhanced computing applications. The Place Lab approach is to allow mobile devices such as notebook computers, PDAs and cell phones, to locate themselves by listening for radio beacons such as 802.11 access points, GSM cell phone towers, and fixed Bluetooth devices that exist in the surrounding environment. These beacons all have essentially unique identifications, for example, a MAC address. The devices compute their own location by hearing one or more IDs, looking up the associated beacons' positions in a stored map, and estimating their own position referenced to the beacons' positions. Additional information about Place Lab is found in: Place Lab: Device Positioning Using Radio Beacons in the Wild, by Anthony LaMarca et al., Pervasive 2005, Munich, Germany; Challenge: Ubiquitous Location-Aware Computing and the "Place Lab" Initiative, by Bill N. Schilit et al., Proceedings of The First ACM International Workshop on Wireless Mobile Applications and Services on WLAN (WMASH 2003), San Diego, Calif. Sep. 2003; A Case Study in Building Layered DHT Applications, by Yatin Chawathe et al., Jan. 2005; Accuracy Characterization for Metropolitan-scale Wi-Fi Localization, by Yu-Chung Cheng et al., Proceedings of Mobisys 2005, Jan. 2005; Social Disclosure of Place: From Location Technology to Communication Practices, by Ian Smith et al., Pervasive 2005, Munich, Germany; and Privacy and Security in the Location-enhanced World Wide Web, by Jason I. Hong et al., Proceedings of Ubicomp 2003, Seattle, Wash. Oct. 2003.

Another positioning system is that of Skyhook Wireless which uses a database of known Wi-Fi access points to calculate the precise location of any Wi-Fi enabled device. For this system, known Wi-Fi networks are mapped, e.g., by having hired drivers travel every street in a neighborhood, and a user's location is calculated based on the Wi-Fi networks the Wi-Fi enabled device detects at a given moment using proprietary software. If the device can identify three networks, it can determine its position, e.g., using triangulation. The more networks the device detects simultaneously, the more accurate the locational fix.

OBJECTS AND SUMMARY OF THE INVENTION

It is an object of the present invention to provide new methods and systems for enabling the location of a wireless computing device or a mobile device to be obtained by another wireless computing device or mobile device.

In order to achieve the above object and others, a method for providing the location of a first mobile device to a second device in accordance with the invention generally includes generating a query at the second device for the location of the first device (for example, an SMS message or push e-mail message), directing the query to the first device, determining the location of the first device upon receipt of the query by the first device, and directing the determined location of the first device to the second device, e.g., in the form of an SMS message. The location of the first device is therefore provided in response to a generated message to thereby provide a message-based location responding system.

Applying the invention, a user of the second device is easily able to obtain the location of the first device, and presumably also the location of the user of first device. Two people with such mobile devices would therefore be readily able to find each other by sending queries from each device to the other device to enable each person to ascertain where the other person is. From successive location determinations, the people could converge to a common location.

The nomenclature of the "first device" and "second device" is not meant to limit the invention to only two devices but is generally used to indicate a mobile device whose location is sought (the first device) and a device (mobile or otherwise) being used to obtain the location of another device (the second device). The method, and system in accordance with the invention can be used with a considerable number of devices, all of which would be equipped with basically the same software.

A query may be generated at the second device for the location of the first device by enabling a user of the second device to create the SMS message or push e-mail message requesting the location of the first device by input of data about the first device. The data about the first device may be a phone number or an e-mail address associated with the first device.

The location of the first device may be determined by transmitting a request from the first device to a central server for its location, via an SMS message or using Internet protocol, and determining, at the central server after receipt of the request, the location of the first device. The request may be transmitted via an SMS message or using Internet protocol. The central server can determine the location of the first device, for example, based on information about reception by the first device of signals from wireless beacons whose position is contained in a database maintained or otherwise accessible by the central server.

The location of the first device may be directed to the second device by transmitting it to the second device directly from the central server, e.g., via an SMS message, without transmitting the location of the first device from the central server to the first device. Alternatively, the location of the first device may be directed to the second device by transmitting it from the central server to the first device using Internet protocol and then transmitting it from the first device to the second device using Internet protocol.

In one embodiment, the user of the first device is not notified of the request for its location, and the request is not otherwise indicated by operation of the first device. To enable this, the query may be generated by the second device with a predetermined code or term. The first device monitors incoming messages for a query with the predetermined code or term to enable any messages with the predetermined code or term to be automatically detected. The determination of the location of the first device is initiated upon detection of a query with the predetermined code or term. Queries are then removed from a queue of incoming messages before indicating receipt of such queries on or by the first device.

To implement the above method, a platform for providing a location of mobile devices in accordance with the invention includes a first mobile device, and a second mobile device including a computer program embodied on computer-readable media and arranged to generate a query for the location of the first device and direct the query to the first device. The first device includes a computer program embodied on computer-readable media and arranged to detect receipt of the query from the second device and initiate a determination of the location of the first device upon detection of the receipt of the query. A central server includes a computer program embodied on computer-readable media and arranged to direct the determined location of the first device to the second device. The computer programs in the first device, second device and central server are arranged to perform the steps of the methods described above.

Other and further objects, advantages and features of the present invention will be understood by reference to the following specification in conjunction with the annexed drawings, wherein like parts have been given like numbers.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
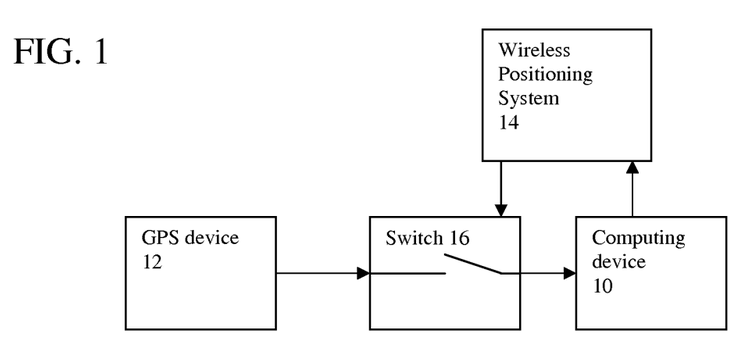
FIG. 1 is a schematic of a general concept used in the invention for enabling position of a mobile device to be determined.

Referring first to FIG. 1, to provide a system and method for enabling a mobile device to determine its position using a wireless and/or satellite-based positioning system irrespective of the reception of positioning signals therefrom by the mobile device, each mobile device 10 is coupled to a wireless or satellite-based positioning systems such as a GPS device 12 such that the mobile device 10 and GPS device 12 are effectively collocated. Using positional data provided by the GPS device 12 and data about wireless beacons, Wi-Fi access points, cell phone towers or other comparable systems (hereinafter referred to as beacons) within reception range of the mobile device 10, the mobile device 10 creates a database of wireless beacons within a wireless positioning system 14 including the geographic location of each beacon (the exact manner in which such a database is formed is described below).

A software switch 16 is interposed between the GPS device 12 and the mobile device 10 to vary the manner in which a determination by the mobile device 10 of its position is made. Specifically, when the GPS device 12 receives an accurate positioning signal, switch 16 would allow this GPS signal to be directed to the mobile device 10 so that the mobile device would consider its position that determined by the GPS signal. On the other hand, when the GPS device 12 is unable to provide an accurate GPS signal, switch 16 would allow a positioning signal derived from the wireless positioning system 14, and based on input from the mobile device 10 at that time, to be directed to the mobile device 10 and the mobile device 10 would consider its position that indicated by this positioning signal.

Switch 16 would operate to revert back to allowing a GPS signal from GPS device 12 to be directed to mobile device 10 once GPS device 12 provides an accurate GPS signal. Accuracy of the GPs signal can be made in a manner known to those skilled in the art.

Accordingly, the mobile device 10 would be able to continuously know its position even in the absence of an accurate GPS signal. The mobile device 10 could be designed to indicate the source of its positioning signal, e.g., an icon on a screen thereof could indicate either a satellite-derived signal (a signal from GPS device 12) or a database-derived signal (a positioning signal from wireless positioning system 14).

Although represented as separate elements in FIG. 1, this is for the purposes of explanation only and it should be understood that mobile device 10 can include wireless positioning system 14 and switch 16 can be software implemented in the mobile device 10. Moreover, GPS device 12 can also be incorporated into the mobile device 10 so that a single handheld or portable unit could include the entire system in accordance with this embodiment of the invention.

The database of wireless beacons in wireless positioning system 14 can be considered a map which associates the fixed physical location of each wireless beacon, i.e., where they are geographically located, with a unique or semi-unique identification code of each wireless beacon. The location of each beacon can be expressed, for example, by latitude and longitude, or possibly by another coordinate system.

Construction of such a map may be accomplished in a variety of ways, the simplest but most labor intensive being to place a positioning device, e.g., a GPS device, at the same location of each wireless beacon to thereby obtain the physical location of the wireless beacon from the GPS device. This however is highly impractical in view of the constant addition of wireless beacons and the manpower that would be required.

A preferred and far simpler method would be to collect data about each wireless beacon based on information about the strength of a signal provided by each wireless beacon at a plurality of locations at which a signal from that wireless beacon is being received. Basically, the geographic location of each wireless beacon is determined based on analysis of the signal strength provided by that wireless beacon as a function of geographic location.

Figure 2:
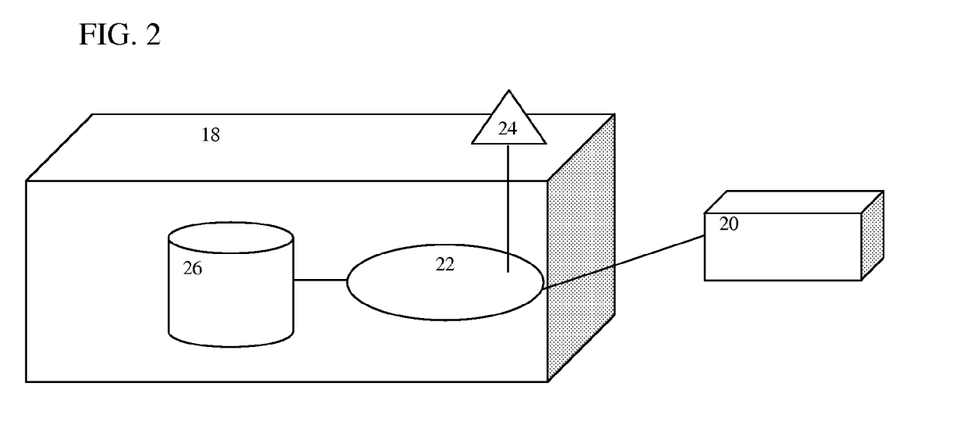
FIG. 2 is a schematic showing a scanner used to create a database of wireless beacons in accordance with the invention.

To enable such an analysis, a scanner 18 is equipped or collocated with a GPS device 20 and during movement of the scanner 18, a series of readings consisting of the position of the scanner 18, obtained using the GPS device 20, and the strength of the signal received at this position are obtained from a wireless beacon (see FIG. 2). The scanner 18 may be a hand-held mobile device such as a PDA or cell phone including a processor having software 22 designed to analyze the signal received via an antenna 24 from every single beacon at different positions and estimate a geographic location thereof. A series of readings for each beacon will be stored in a database 26. Thus, if multiple beacons are being mapped, there will be multiple series of readings.

Figure 3:
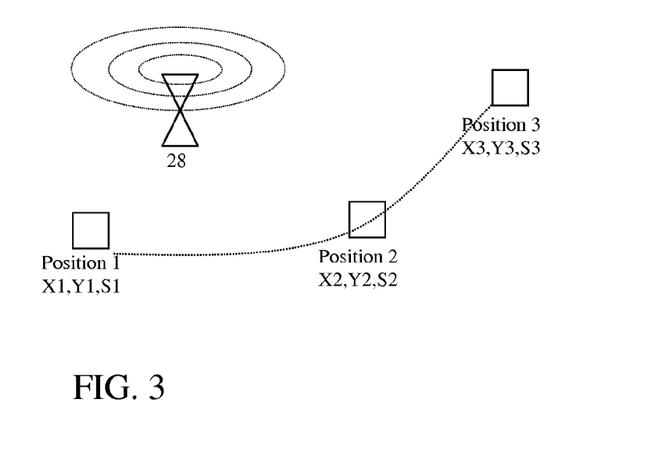
FIG. 3 is an illustration of multiple scanner readings obtained to create the database of wireless beacons.

Referring to FIG. 3, these readings will look like a series of data sets designated (Xi, Yi, Si) where Xi and Yi are the latitude and longitude, respectively, of the position of the scanner 18 and Si is the strength of a signal received at this position from wireless beacon 28. With the scanner 18 at position P1, a reading of (X1,Y1,S1) is obtained, with the scanner 18 at position P2, a reading of (X2,Y2,S2) is obtained and with the scanner 18 at position P3, a reading of (X3,Y3, S3) is obtained.

Figure 4:
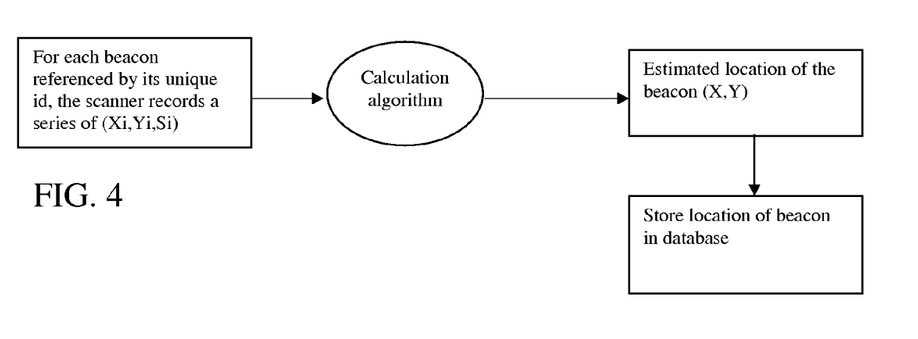
FIG. 4 is a flowchart showing the mapping of wireless beacons from the scanner readings.

Each series of readings, i.e., the readings obtained from each individual beacon 28, recorded by the scanner 18 may be stored in the scanner's memory. To obtain an estimated position of each beacon, the series of readings relating only to that beacon is input to a calculation algorithm 30 that processes the readings to provide as output, an estimated position of the beacon 28 (see FIG. 4). If multiple series of readings are input to the algorithm, then the position of all of the beacons 28 from which readings were obtained will be output.

Note that at each position of the scanner 18, multiple readings can be obtained, one for each beacon 28 in reception range of the scanner 18. These readings can be stored with an identification of the beacon 28 so that the readings can later be combined with other readings from the same beacon 28 in order to determine the location of the beacon 28.

Different calculation algorithms 30 can be used in the invention to process each series of readings into the position of the beacon 28. These include Centroid, triangulation, Newton and the like. An exemplifying calculation algorithm 30, namely the Centroid algorithm, is described below. Generally, regardless of which algorithm 30 is used, approximately the same estimated position of the beacon 28 will be obtained and thus, the invention is not limited to use of any particular algorithm.

It is important to bear in mind that scanner 18 can be and typically is the same as mobile device 10 (in which case, GPS device 20 is the same as GPS device 12, the software 22 and database 26 would be part of the wireless positioning system 14 and antenna 24 would be part of the mobile device 10). This embodiment will be considered hereinafter. In this case, mobile device 10 would not only create and/or update the database 26 of wireless beacons in the wireless positioning system 14 via operation of the scanning software 22 (when GPS signals from GPS device 12, 20 are available) but would also use the same database 26 of wireless beacons it is updating to determine its position in the absence of an accurate GPS signal from the GPS device 12, 20 (when GPS signals from GPS device 12, 20 are not available). Thus, when GPS signals are available and switch 16 is allowing the GPS signal from the GPS device 12, 20 to be directed to the mobile device 10, mobile device 10 is working as scanner 18 to scan the area around the mobile device 10 to determine the presence of (unmapped) wireless beacons and obtain geographic positional information about these unmapped wireless beacons for inclusion in the database 26 of wireless beacons resident in the wireless positioning system 14.

After the estimated position of the beacons is obtained, the final step in creating the database 26 of wireless beacons in wireless positioning system 14 is to store the positions of the beacons 28 in a database in a manner in which the position of the beacon is associated with an identification code. For example, the position of each beacon 28 can be stored in the database 26 in the form (Id, X, Y) where Id is a unique identification associated with or referencing the beacon 28 and X, Y are the latitude and longitude coordinates, respectively, of the beacon 28 as determined in the manner described above.

The database creation step continues whenever a GPS signal is available and the position of the scanner 18 has changed. Thus, when the scanner 18 is the same as mobile device 10, movement of the mobile device 10 in the presence of a GPS signal from GPS device 12, 20 can result in continuous updating of the database 26 of wireless beacons in wireless positioning system 14.

In the exemplifying use described above with respect to FIG. 1, the database 26 of wireless beacons in wireless positioning system 14 is used only when a GPS signal from GPS device 12, 20 is unavailable. At this time, it is necessary to input data into the database 26 to determine the position of the mobile device 10.

Figure 5:
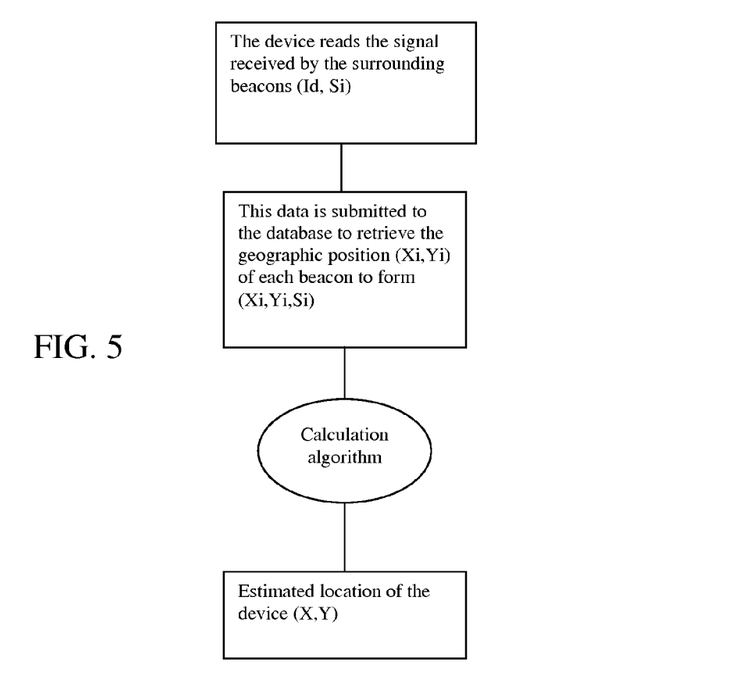
FIG. 5 is a flowchart showing the determination of the position of a mobile device based on instantaneously received signals from wireless beacons and the database thereof.

With reference to FIG. 5, determining the position of the mobile device 10 using the database 26 of wireless beacons in wireless positioning system 14 entails querying a receiver unit of the mobile device 10, i.e., a network adapter or cell antenna 24, to find out which wireless beacon(s) 28 are "visible" and what is the strength of the signal received by the receiver from each wireless beacon 28. Visible beacons 28 are those from which the receiver receives a signal.

From the antenna 24, the mobile device 10 will obtain a series of readings each containing the unique identification associated with or referencing one of visible wireless beacons 28 and the strength of the signal from that wireless beacon 28. This series of readings can be expressed in the form of (Id, Si) where Id is the unique identification of the wireless beacon 28 and Si is the signal strength.

The mobile device 10 then submits this information to database 26 in wireless positioning system 14 which contains the geographic location of the wireless beacons 28 in association with their identification. Using the data contained in the database 26, the corresponding, estimated geographic location of the wireless beacon 28 is obtained based on its identification contained in the information and is associated with the signal strength.

After the location of the visible beacon(s) 28 associated with the antenna 24 is known, a series of (Xi, Yi, Si) records is provided to the calculation algorithm 30 to estimate the position of the antenna 24, i.e., the position of the mobile device 10.

As described above, a calculation algorithm 30 is used to determine the position of a wireless beacon 28 when creating the database 26 of wireless beacons and also to determine the position of the mobile device 10 in the absence of a GPS signal from GPS device 12, 20.

When determining the position of a wireless beacon 28 in the mapping mode from the series of readings (Xi,Yi,Si) to determine the position (X,Y) of the wireless beacon 28, the Centroid calculating algorithm averages the latitudes and longitudes recorded and adds the signal strength squared as a weight:

$$X=(S1^2*X1+S2^2X2+\ldots+Sn^2*X2)/(S1^2+S12^2+\ldots+Sn^2)$$

$$Y=(S1^2*Y1+S2^2Y2+\ldots+Sn^2*Y2)/(S1^2+S12^2+\ldots+Sn^2)$$

where X and Y are the estimated position of the beacon 28 and the Si, Xi, Yi the information recorded by the scanner 18.

When estimating the position of the mobile device 10 using the same formula, Xi, Yi would be the coordinates of the wireless beacons 28 referenced in the database 26 and Si would be the strength of the signal received from those same wireless beacons 28.

Applying the database mapping technique described above using scanner 18, when incorporated into the mobile device 10 with a common GPS device 12, it becomes possible to create a collaborative database. That is, a database which is continually being updated with data about new wireless beacons can be formed. Scanner 18 obtains identification and signal strength data about new, unmapped wireless beacons when the GPS device 12 receives accurate positioning signals and determines the position of the unmapped wireless beacons for inclusion in the database of wireless beacons in the wireless positioning system 14 which is used when accurate GPS signals from GPS device 12 are not available. The same positional information about previously unmapped wireless beacons being directed to the database in the wireless positioning system 14 can also be directed to a central monitoring or administration facility which is charged with the responsibility for providing an accurate database of wireless beacons. The positional information can be forwarded to this facility periodically, such as every 24 hours. In conjunction with an upload of positional information about new wireless beacons, positional information about new wireless beacons obtained from other mobile devices 10 can be downloaded from the facility.

The central facility thereby oversees collection of individual contributions to the database, one from each participating (collective) mobile device, and disseminates the collection of the individual contributions to all mobile devices using the same positioning technique. It must be understood that not all mobile devices 10 will be equipped with a scanner 18 in which case, only some mobile devices would contribute positional information to the central facility but all mobile devices would preferably receive the update of positional information. Since the uploading of the positional information from the mobile devices to the central facility and downloading of the positional information from the central facility to the mobile devices may be done without involvement of the user, the central and individual databases of wireless beacons can therefore be passively created, updated and disseminated.

Figure 6:
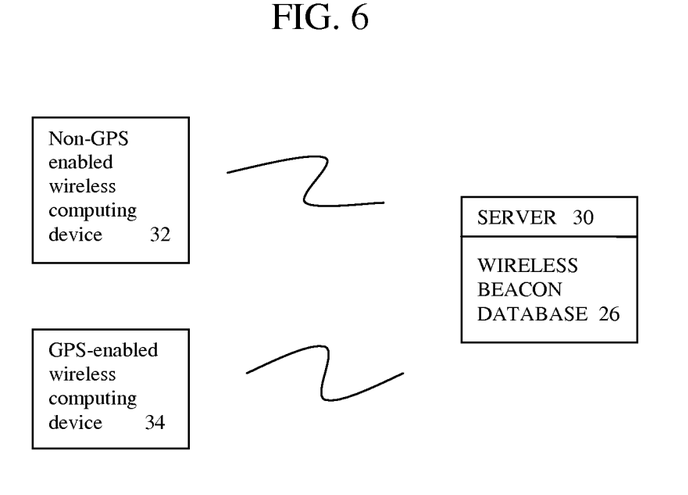
FIG. 6 is a schematic of an embodiment of the invention for enabling a mobile device to determine its position.

Database 26 of wireless beacons can be maintained by the central facility and in addition or alternatively, can be installed onto a deployable server, e.g., server 30 of FIG. 6. Such a deployable server 30 can be sold or leased to customers to enable them to continually determine the position of any movable device having an Internet connection under their authority or control, without requiring access to the central facility. The server 30 could be periodically provided with database updates. In this manner, a large company for example, could employ such a server 30 to track its personnel and vehicles having mobile devices. By separating the database construction and database use, such a company would not have to concern itself with the scanning feature to create and update the database as described above.

The deployable server 30 could also be operated in conjunction with scanners by the purchaser or lessor of the server 30. That is, a client could have control of both the mapping or scanning functions and the position locating system. A third party could provide management and storage of the database, control access to the database and position location information as per the customer's specification and otherwise relieve the customer of the responsibilities of managing the system.

Another application of the ability to determine the position of a mobile device 10 in accordance with the invention, and primarily laptop computers, is the ability to provide an Internet-based service that would almost immediately advise the user of a mobile device 32, 34 of their position (see FIG. 6). This service could be formed as a computer software program, downloadable upon request, and installed in the mobile device 32, 34. The user's position would be provided either continually, periodically or upon request. The latter implementation is a "query mode" of use of the invention In the query mode, an icon could be created to enable initiation of a positional display so that whenever the user wants to know his or her position, they could click on the icon and their position would be provided (in the manner as described above with reference to FIG. 5). Such an icon could be continually or periodically displayed on the screen and whenever clicked by the user, the user's position would be displayed. A background icon could also be formed. It is important to note that the user's position can be continuously determined and only displayed upon request by the user or the user's position could be both determined and displayed only upon request by the user.

Additionally or alternatively, the program can provide an option to the user to have a section of the screen display the user's position. Such a display may occupy a corner of the screen.

In this scheme, the user of the mobile device is able to obtain his or her position even though the mobile device is not equipped with a GPS or other satellite-based position determining system (mobile device 32). Rather, using only a Wi-Fi connection to the Internet, and specifically a link to a server or site 30 which maintains the database of beacons 26, the user is able to communicate with the site 30 and be provided with their position. Such a service may be a fee-based service wherein the users pay a monthly fee, pay per request for their position, free subject to position-based advertising exposure or any other manner known to those skilled in the art of providing an Internet-based service.

The foregoing description of embodiments of the invention for position determination of mobile devices relies on the knowledge of the exact identification details of wireless beacons, including their country identifier, region identifier and cell identification. Thus, when a user requests the position of their mobile device, the algorithm can use the beacon information and provide the user's position. However, in some countries or regions of countries, there may be an insufficient number of known beacons in the database, or possibly no beacons in the database, to provide the exact position of the user.

In this case, so long as the mobile device is able to connect wirelessly to the Internet using one or more beacons, the program can nevertheless provide a country identifier at a minimum from the data about known beacons in the database, and based on the ability of the mobile device to communication with the beacon(s). In addition, often it will be possible to provide the region identifier from the data about known beacons in the database when the mobile device is capable of communicating with one or more of the beacons. Although a determination of the user's country identifier and possibly region identifier is often not optimal, it is significantly better that the absence of a determination of any positional information.

The problem may arise when the identification of the beacon with which the mobile device is communicating is not known, i.e., is not in the database. The inability to provide accurate positional information will persist until the mobile device maps the beacon, if it is able, or the database is updated with information about the unidentified beacon.

Another feature of the system in accordance with the invention is the ability to track mobile devices. This feature involves creating a group of authorized users (of mobile devices) among which the position of all of the users in the group will be shared, either directly or through a server 30. So long as each user communicates with a wireless beacon, each user's position is determined by the system in the user's mobile device and provided through the wireless Internet connection (and possibly the server 30) to the other users in the group. Each user can determine when they want their position to be provided to the other users in the group. This embodiment is operative whenever the user's mobile device is GPS-enabled, e.g., mobile device 34, and for those users without GPS-enabled mobile devices, e.g., mobile device 32, it is still operative when they are present in a mapped area and capable of communicating with a server 30 containing the beacon database 26, to enable their position to be determined based on the signals from wireless beacons in the manner described above.

Creation of a group may also be applicable when forming a database of wireless beacons. A group can be created which shares database information among the members of the group prior to forwarding the database updates to the central server 30. In this case, only one member of the group needs to communicate with the central server 30 to provide the update information and receive update information in return. The received update information is them disseminated to the other members of the group. It becomes apparent that only one member of each group is required to communication with the central server 30.

Yet another feature of the system described above is the ability to present to the user information based on their position. For example, once the mobile device determines its position in the manner described above, the user can be provided with an entry field to input a desired type of establishment, e.g., coffee shop, hotel, restaurant, pharmacy, and the system will then look up using the Internet connection, one or more closest establishments based on the user's position.

Once the position of mobile devices is determined in accordance with the invention, and thus the position of the users' thereof, it becomes possible to use the positional data in various ways. One way is to tailor advertising to the users based on their position. Another way is to provide information about requested types of establishments as described above. Another way is to perform a statistical analysis of the position of users to specific websites. That is, the operator of a website may want information about the location of the people accessing that website and using mobile device. The invention can readily provide such information in that it determines the users' locations and can forward that information to the website operator whenever the user is linked to the website.

Yet another way is to use the user's location to limit or restrict transmission of data, i.e., if the user is present in a certain country, transmission of certain data to that country would not be possible. Also, the server's determination of the geographical location of the user's mobile device can be used to verify or confirm information about the user's location provided by the user. That is, if the user inputs information indicating they are situated in one place while the server determines they are situated in a different place, transmission of data to the user can be restricted in view of this discrepancy.

Figure 7:
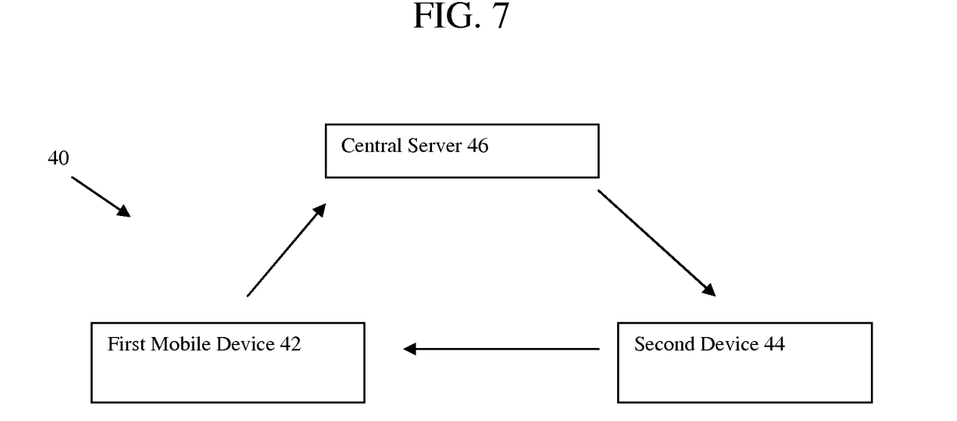
FIG. 7 is a schematic of a first embodiment of a message-based location responding system in accordance with the invention.
Figure 8:
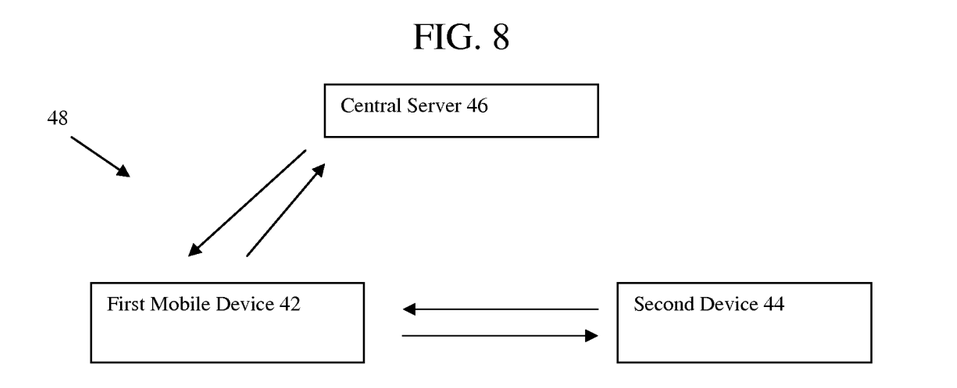
FIG. 8 is a schematic of a second embodiment of a message-based location responding system in accordance with the invention.

Referring now to FIGS. 7 and 8, any of the foregoing techniques for a mobile device to determine its location may be applied in a platform or system 40 which can provide the location of a first mobile device 42 to a second device 44 upon request by that second device 44, with or without the user of the first device 42 knowing that their position is being provided to the second device 44. That is, one person can obtain the location of another person, or at least the location of their mobile device which will be assumed to be the same as the location of that person, using communications involving the devices 42, 44 and a central server 46. Although the second device 44 may be a mobile device, it may be another electronic device, including a computer at a generally fixed location, which can connected with the central server 46 and transmit messages to the first mobile device 42.

System 40 relies on the use of the transmission of messages between electronic devices, such as SMS messages, the protocol for which is well-known in the art and the programming required for computer software in a mobile device or other wireless computing device to generate such messages is also well-known in the art. When the user of the second device 44 wants to obtain the location of the user of the first device 42, the user would operate the second device 44 to generate a query for the location of the first device 42. The computer program in the second device 44 would include a query application to allow for generation of the query. This query would be converted by the computer program in the second device 44 into an SMS message which is directed to the first device 42 (the transmission of this query being represented by an arrow from the second device 44 to the first device 42). A computer program in the first device 42 receives the SMS message, interprets it as a request for the location of the first device 42 and then initiates a determination of its location.

The query for the location of the first device 42 may also be generated using push e-mail, in which case, the computer program at the second device 40 would include a push e-mail generating application. The computer program at the second device 44 may also be arranged to receive data about the first device 42, e.g., an e-mail address or phone number, and generate the query in an appropriate form based thereon, e.g., push e-mail or SMS message.

After initiation of the location determining feature of the first device 42, the location of the first device 42 may be determined or otherwise obtained using any of the various techniques described above. In one technique, the first device 42, if equipped with a GPS-enabled location determining application, would determine its location using GPS. If the first device 42 is unable to obtain a satisfactory GPS-based location determination or does not have GPS capabilities, it may access its internal database of known wireless access beacons and their location, and determine its location from signals being received from these wireless beacons (see the detailed discussed above for an explanation of this technique).

Alternatively, the first device 42 may interact with the central server 46, transmitting a request to the central server 46 for its location (represented by the arrow from the first device 42 to the central server 46), with the central server 46 then determining the location of the first device 42. The computer program in the first device 42 may be arranged to transmit this request to the central server 46 via an SMS message or using an Internet protocol (http or TCP/IP). To enable the central server 46 to determine its location, the first device 42 would provide information about, for example, its reception of signals from wireless beacons to the central server 46 which would then determine the location of the first device 42 based on such information in combination with data from a database maintained by or other accessible to the central server 46 about the location of the wireless beacons (see the detailed discussion above for an explanation of this technique). These location determining techniques are examples of the manner in which the location of the first device 42 may be determined and are not meant to limit the invention in any way whatsoever. Indeed, the invention expressly contemplates the use of alternative techniques to determine the location of the first device 42, known to those skilled in the art, upon initiation of a request for such a determination by the first device 42.

Once the location of the first device 42 is determined, it is provided to the second device 44.

As shown in FIG. 7, the location of the first device 42 may be provided directly from the central server 46 to the second device 44 in any known manner (represented by the arrow from the central server 46 to the second device 44). One such manner is the use of an SMS message, in which case, the second device 44 could generate an SMS message to obtain the location of the first device 42 and receive a responsive SMS message providing the location of the first device 42.

In the alternative, as shown in FIG. 8, the location of the first device 42 is directed to the second device 44 by transmitting the determination of the location of the first device 42 from the central server 46 to the first device 42, for example using Internet protocol, and then transmitting the location of the first device 42 from the first device 42 to the second device 44, for example, using Internet protocol (each of these transmission is represented by an arrow). In this case, there is no direct communication of the location of the first device 42 from the central server 46 to the second device 44.

For certain purposes, it may not be desirable to notify the user of the first device 42 that their position is being provided to the second device 44. To this end, the computer program in the first device 42 may be programmed to initiate its location determination and interact with the central server 46 without causing a change in the operation of the first device 42 which is discernible by the user. That is, the computer program avoids indicating any operation of the location determining application and any indication of a received communication from the second device 44. Moreover, the central server 46 would not transmit the determined location of the first device 42 thereto, or if transmitted, the computer program at the first device 42 may be programmed to store the determined location and use it only upon subsequent need or request by the first device 42.

One way to avoid notifying the user of the first device 42 that their location is being determined and provided to the second device 44 is to monitor a queue of incoming SMS messages and e-mail messages and automatically detect a query from another device, such as the second device 44, for the location of the first device 42, which is in the form of a message. Specifically, the computer program at the first device 42 would analyze the queue of incoming messages before they are indicated as being received to the user of the first device 42, grab any query messages from the queue relating to a location determination, recognize the need to initiate the location determining function from the grabbed query messages, initiate the location determining function and remove the query messages from the queue to avoid their presentation to the user. The query messages could also be left in the queue if it is not desired to prevent the user of the first device 42 from seeing that others want to know their location.

To enable the computer program to detect query messages, a predetermined "action code", or term, may be used by the second device 44 to include or associate with the query with the computer program in the first device 42 being arranged to recognize the action code or term. The action codes or terms may be provided by the central server 46.

In order to enable the first and second devices 42, 44 to perform as described above, each must be provided with a computer program embodied on computer-readable media therein. The computer program may include a location determination/notification application (which performs the functions of the first device 42 as described above) or a query application (which performs the functions of the second device 44 as described above) or both. That is, a device may be provided with only the query component if the user thereof only wants to be able to obtain the location of other mobile device users without their location being obtainable, or with only a location determination component which would not allow the user to obtain the location of other mobile device users. These computer program components may be downloaded and installed individually or in combination.

The computer program in the first device 42 may be arranged to detect receipt of a location determination query from another device, possibly authenticate the request to avoid misuse of the system 40, and then initiate a determination of the location of the first device 42. The computer program may be designed to monitor a queue of incoming SMS messages and e-mails, detect a query message from another device for the location of the first device 42, grab any query messages, recognize the need to initiate the location determining function from the grabbed query messages and then initiate the location determining function and optionally remove the query messages from the queue. If a predetermined action code or term is used and associated with a message to indicate it is a query message, then the computer program would analyze the incoming messages for the presence of the action code or term. The action codes or terms could be stored in a memory of the first device 42 which is accessed by the computer program.

Initiation of the location determining function may entail generating and transmitting a request to the central server 46 for the location of the first device 42. Alternatively, the computer program determines the location of the first device 42 and would then control a transmission application to transmit it to the central server 46, for example, using SMS messages or Internet protocol. The computer program may optionally be arranged to avoid notifying a user of the first device 42 of the detection of the query from the second device 44 for the location of the first device 42, as well as the subsequent actions arising from the receipt of the query.

The computer program in the first device 42 also controls a transmission unit to transmit its determined location to the second device, for example, using Internet protocol, when the first device serves a conduit between the central server 46 and the second device 44 (see FIG. 8).

The computer program in the second device 44 may be arranged to enable a query for the location of another device having at least the location determination component of the same computer program, such as the first device 42, to be generated, e.g., via an SMS message application or a push e-mail application, and direct the query to the first device 42. The query may be directed via a communications network in the same manner as existing SMS messages or e-mail messages are transferred between wireless computing devices or mobile devices or other computers. If action codes are used, the computer program would be arranged to include or otherwise associate an action code or term with the messages to designate it as a query message, and thereby enable the computer program on the first device 42 to detect that the message is a query message requiring initiation of a location determining function of the first device 42.

The central server 46 also includes a computer program embodied on computer-readable media which coordinates the interaction between the devices 42, 44 using the location determining platform or system 40. It would therefore control a transmission unit of the central server the direct the determined location of the first device 42, whether provided by the first device 42 or determined at the central server 46 based on signals received from the first device 42, to the second device 44. It would also control the transmission unit to direct the responsive SMS message to the second device 44 (see FIG. 7) and the transmission to the first device 42 (see FIG. 8).

The embodiment wherein first device 42 is not notified and does not react to the query message from the second device 44 has excellent application in the field of recovering lost or stolen objects. If the first device 42 is lost or misplaced, the owner of the first device 42 can send a query message to the first device 42 from a second device 44 causing the first device 42 to return its location to the second device 44 thereby providing the owner with the location of the lost or misplaced first device 42.

For stolen objects, recovery of not only the first device 42 itself but also of objects associated with the first device 42 is greatly facilitated since the first device 42 can provide its location without the possessor thereof knowing that the location is being provided. Thus, if the first device 42 is stolen, the owner of the first device 42 can send a query message to the first device 42 from a second device 44 causing the first device 42 to return its location to the second device 44 thereby providing the owner with the location of the stolen first device 42. This location can be provided to law enforcement authorities who can proceed to the location to retrieve the stolen first device 42 and possibly apprehend the thief.

If the first device 42 is situated in a vehicle, or incorporated into the vehicle, and stolen, the owner of the first device 42 can again send a query message to the first device 42 from a second device 44 causing the first device 42 to return its location to the second device 44 thereby providing the owner with the location of the stolen vehicle. This location could be provided to law enforcement authorities who can proceed to the location to retrieve the stolen vehicle and possibly apprehend the thief.

A system is also envisioned whereby vehicles could be provided with mobile devices like the first device 42 and law enforcement authorities are provided with a second device 44, any computer equipped with the query generating software component whether situated at a police station or in a mobile police vehicle, and software is provided to enable the law enforcement authorities to determine the locations of any vehicles. In this case, a vehicle owner would report a stolen vehicle to the law enforcement authorities who would then use their second device 44 send a location determining query to the first device 42 on that vehicle and retrieve the location of the vehicle. In view of the relatively low cost for hardware and software components to implement the first device 42, this would provide a relatively inexpensive vehicle theft prevention system. Also, the first device 42 can be situated on the vehicle in a manner which prevents its removal and tampering therewith.

Also disclosed above is a system for enabling a mobile device to continuously determine its position in accordance with the invention includes a mobile device and a wireless positioning system substantially collocated therewith. The wireless positioning system has a first positioning mode in which it communicates with a wireless positioning network to enable the geographic location of the mobile device to be determined upon reception of signals from the wireless positioning network and a second positioning mode in which it enables the geographic location of the mobile device to be determined upon reception of signals from one or more of the wireless beacons and analysis of the signals in light of positional information about wireless beacons contained in a database. The wireless positioning system switches between the first and second positioning modes to obtain a determination of its geographic location depending on reception of signals from the wireless positioning network. Since the locational information in the first positioning mode, i.e., that from the wireless positioning network, is more accurate, when such information is available it is used and when unavailable, a database-derived location is provided. The switch may be implemented as a software-switch. In the second positioning mode, the wireless beacons provide identification information which is associated with data about the strength of a signal therefrom and received by the mobile device. This identification and signal strength data is input into a calculation algorithm which determines the geographic location of the mobile device therefrom, the identification information being used to obtain positional information about the wireless beacons which is contained in the database.

To create the database, particularly constructed mobile devices are used. Specifically, the mobile devices is provided with a scanner arranged to communicate with the wireless positioning network to enable its geographic location to be determined upon reception of signals from the wireless positioning network, for example, coupled to a GPS device. The scanner then obtains positional information about itself and identification and signal strength information about wireless beacons in order to derive the geographic location of the wireless beacons for inclusion in the database, using a calculation algorithm. In particular, software in the scanner analyzes the strength of signals received from the wireless beacons at a plurality of different positions of the scanner and applies an algorithm to determine the position of the wireless beacons therefrom.

A method for enabling a mobile device to continuously determine its position in accordance with the invention involves coupling the mobile device to a wireless positioning network to enable the geographic location of the mobile device to be determined upon reception of signals from the wireless positioning network, providing a database of identification and positional information about wireless beacons and enabling the geographic position of the mobile device to be continuously determined by obtaining a position signal derived from the signals from the wireless positioning network upon reception thereof and in the absence of reception of usable signals from the wireless positioning network, deriving a position signal from reception of signals from wireless beacons detected by the mobile device and analysis of the received signals using the database. The database is constructed by obtaining identification and signal strength data about each wireless beacon at a plurality of locations at which a signal from that wireless beacon is being received and applying an algorithm to determine positional information about the wireless beacons based on the signal strength data.

A method for administering a database of wireless beacons in accordance with the invention entails maintaining a central database of wireless beacons, providing the central database to a plurality of mobile devices, enabling each mobile device to determine identification and positional information about wireless beacons not contained in the central database, periodically forwarding the identification and positional information about wireless beacons not contained in the central database from the mobile devices to the central database, updating the central database to include the forwarded identification and positional information, and periodically directing the updates of the central database to the plurality of mobile devices. Each mobile device can be designed to determine identification and positional information about wireless beacons as described above with respect to use of the scanner.

A related embodiment of the invention is a system for enabling a mobile device to continuously determine its position in which a central database is provided containing identification and positional information about wireless beacons and receives identification and positional information about wireless beacons not previously contained therein and generates database updates based thereon. Mobile devices each include a local database containing positional information about wireless beacons and wirelessly communicate with the central database to receive the database updates and add the database updates to the local database. A wireless positioning system is substantially collocated with each mobile device and enables the geographic location of the mobile device to be determined upon reception of signals from at least one wireless beacon and analysis of the signals in light of the positional information about wireless beacons contained in the local database. This location determination can be performed in any of the ways described above.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for providing the location of any one of a plurality of first mobile devices to any one of a plurality of second devices, comprising:
generating a query at any one of the plurality of second devices for the location of any one of the plurality of first devices;
creating a message at the second device from the generated query, the step of creating the message from the generated query comprising incorporating a predetermined code or term into the message;
directing the message, created at the second device from the generated query, from the second device to the first device using a message transmission system;
monitoring incoming messages at the first device for a message with the predetermined code or term to thereby detect any messages with the predetermined code or term;
interpreting a detected message with the predetermined code or term as a request for determining the location of the first device such that, in response to receipt by the first device of the message with the predetermined code or term that was created at the second device and directed from the second device to the first device, a location determination of the first device is initiated whenever the message with the predetermined code or term is received by the first device; thereafter
determining, in response to and only after initiation of the location determination of the first device, the location of the first device, the location determining step comprising:
when the first device is equipped with a location determining system, using this location determining system to obtain the location of the first device such that the location of the first device is determined after receipt of the message that was created at the second device by the first device, or
transmitting a request from the first device to a central server for the location of the first device to be determined at the central server, and then determining, upon receipt of that request at the central server, the location of the first device,
wherein the location of the first device is thus determined by the first device or by the central server only after receipt of the message by the first device; then
directing the determined location of the first device or a message related to the determined location of the first device from the first device or from the central server to the second device; and
removing a detected message with the predetermined code or term from a queue of incoming messages at the first device before indicating receipt of such messages by the first device.

2. The method of claim 1, wherein the step of generating a query at the second device for the location of the first device comprises enabling a user of the second device to input data about the first device and the step of creating the message at the second device from the generated query comprises creating an SMS message or push e-mail message based on the input data.

3. The method of claim 2, wherein the data about the first device is a phone number associated with the first device or an e-mail address associated with the first device.

4. The method of claim 1, further comprising avoiding notifying a user of the first device of the query from the second device for the location of the first device.

5. The method of claim 1, wherein the step of determining the location of the first device comprises transmitting the request from the first device to the central server for the location of the first device and determining, at the central server, the location of the first device.

6. The method of claim 5, wherein the request is transmitted by the first device to the central server via an SMS message.

7. The method of claim 5, wherein the request is transmitted by the first device to the central server via Internet protocol.

8. The method of claim 5, wherein the step of directing the determined location of the first device or message related to the determined location of the first device to the second device comprises transmitting the determination of the location of the first device to the second device from the central server without transmitting the location of the first device from the central server to the first device.

9. The method of claim 8, wherein the determination of the location of the first device is transmitted to the second device from the central server via an SMS message.

10. The method of claim 5, wherein the step of directing the determined location of the first device or message related to the determined location of the first device to the second device comprises transmitting the determination of the location of the first device to the second device from the central server, further comprising transmitting the location of the first device from the central server to the first device.

11. The method of claim 5, wherein the step of directing the determined location of the first device or message related to the determined location of the first device to the second device comprises transmitting the determination of the location of the first device from the central server to the first device using Internet protocol and then transmitting the location of the first device from the first device to the second device using Internet protocol.

12. The method of claim 1, wherein the location determining system of the first device is a satellite-based location determining system such that the location of the first device is obtained based on interaction with one or more satellites of the location determining system occurring after receipt of the message that was created at the second device by the first device.

13. A platform for providing the location of a mobile device, comprising:
a plurality of first mobile devices;
a plurality of second devices each including a computer program embodied on computer-readable media, said computer program being configured to generate a query for the location of any one of said first devices, create a message from the generated query, incorporate a predetermined code or term into the message when creating the message from the generated query, and direct the created message from said second device to said first device using a message transmission system;
each of said first devices including a computer program embodied on computer-readable media, said computer program being configured to:
monitor incoming messages for a message with the predetermined code or term to enable any messages with the predetermined code or term to be automatically detected;
remove a message with the predetermined code or term from a queue of incoming messages before indicating receipt of such messages by said first device;
interpret the received message with the predetermined code or term as a request for determining the location of said first device such that, in response to detection of receipt of the message with the predetermined code or term from said second device that was created at said second device and directed from said second device to said first device, a determination of the location of said first device is initiated whenever the message with the predetermined code or term is received by said first device, and thereafter
determine, in response to and only after initiation of the location determination of said first device, the location of said first device when said first device is equipped with a location determining system, using this location determining system to obtain the location of said first device such that the location of said first device is determined after receipt of the message that was created at said second device by said first device and interpreted as a request for determining the location of said first device; and
a central server including a computer program embodied on computer-readable media and configured to direct the determined location of said first device or a message related to the determined location of said first device, which determined location is obtained after receipt of the message by said first device, to said second device,
said computer program in each of said first devices being further configured to transmit a request from said first device to said central server for the location of the first device to be determined at said central server, said computer program in said central server being further configured to determine, upon receipt of that request at said central server, the location of said first device,
whereby the location of said first device is thus determined by said first device or by said central server only after receipt of the message by said first device.

14. The platform of claim 13, wherein said computer program in said first device is further configured to avoid notifying a user of said first device of the detection of the message from said second device for the location of said first device.

15. The platform of claim 13, wherein said computer program in said first device is further configured to transmit the request to said central server via an SMS message.

16. The platform of claim 13, wherein said computer program in said first device is further configured to transmit the request to said central server via Internet protocol.

17. The platform of claim 13, wherein said computer program in said central server is further configured to transmit the location of said first device to said second device without transmitting the location of said first device to said first device.

18. The platform of claim 17, wherein said computer program in said central server is further configured to transmit the location of said first device to said second device via an SMS message.

19. The platform of claim 13, wherein said computer program in said central server is further configured to transmit the location of said first device to both said first and second devices.

20. The platform of claim 13, wherein said computer program in said central server is further configured to transmit the location of said first device to said first devices using Internet protocol and said computer program in said first device is further configured to transmit the location of said first device to said second device using Internet protocol.

21. The platform of claim 13, wherein said computer program in said second device is further configured to enable a user of said second device to generate the query for the location of said first device by inputting data about said first device and create the message from the generated query by creating an SMS message or push e-mail message based on the input data, the data about said first device being a phone number associated with said first device or an e-mail address associated with said first device.

22. A computer program embodied on computer-readable media in a first mobile device and configured to:
enable a query application in which it generates a query for the location of any one of a plurality of other mobile devices, creates a message from the generated query, incorporates a predetermined code or term into the message when creating the message from the generated query, and directs the created message to the other device using a message transmission system, and receives and displays a response indicating the location of the other device or a message related to the location of the other device;

enable a location notification application in which it monitors incoming messages for a message with the predetermined code or term to enable any messages with the predetermined code or term to be automatically detected, interprets the received message with the predetermined code or term as a request for determining a location of the first device, removes a message with the predetermined code or term from a queue of incoming messages before indicating receipt of such messages by the first device, and initiates a determination of the location of the first device only in response to and after interpreting receipt of the message with the predetermined code or term directed from the other device as a request for the location of the first device; and said computer program initiating a determination of the location of the first device whenever the message is received by the first device by determining the location of the first device when the first device is equipped with a location determining system by using this location determining system to obtain the location of the first device such that the location of the first device is determined after receipt of the message directed from the another device; and transmitting a request from the first device to a central server for the location of the first device to be determined at the central server, whereby the location of the first device is thus determined by the first device or by the central server only after receipt of the message directed from the another device.

23. The computer program of claim 22, wherein said computer program is further configured to initiate the location determination by obtaining information about reception of signals from wireless beacons by the first device and providing the information to a central server which determines the location of the first device via an SMS message or using Internet protocol.

24. The computer program of claim 22, wherein said computer program is further configured to avoid indicating receipt of the message from another device.

25. The computer program of claim 22, wherein said computer program is further configured, in the query application, to enable the query to be generated by inputting data about the other device and creating the message as an SMS message or a push e-mail message based on the input data, the data about the other device being a phone number or e-mail address associated with the other device.

* * * * *

UNITED STATES PATENT AND TRADEMARK OFFICE
CERTIFICATE OF CORRECTION

| | | |
|---|---|---|
| PATENT NO. | : 8,565,788 B2 | Page 1 of 1 |
| APPLICATION NO. | : 12/167649 | |
| DATED | : October 22, 2013 | |
| INVENTOR(S) | : Cyril Houri | |

It is certified that error appears in the above-identified patent and that said Letters Patent is hereby corrected as shown below:

On the Title Page, Item (63), on the last line, "7,686,923" is deleted and replaced with --7,696,923--.

Signed and Sealed this
Thirtieth Day of June, 2015

Michelle K. Lee
*Director of the United States Patent and Trademark Office*